No. 738,647. PATENTED SEPT. 8, 1903.
J. A. WILLIAMS & L. B. BRITTON.
CAR FENDER.
APPLICATION FILED APR. 29, 1903.
NO MODEL. 2 SHEETS—SHEET 1.

WITNESSES:
A. B. Mattingly
E. E. Ellis

INVENTORS
John A. Williams
Lester B. Britton
BY
Munn
ATTORNEYS.

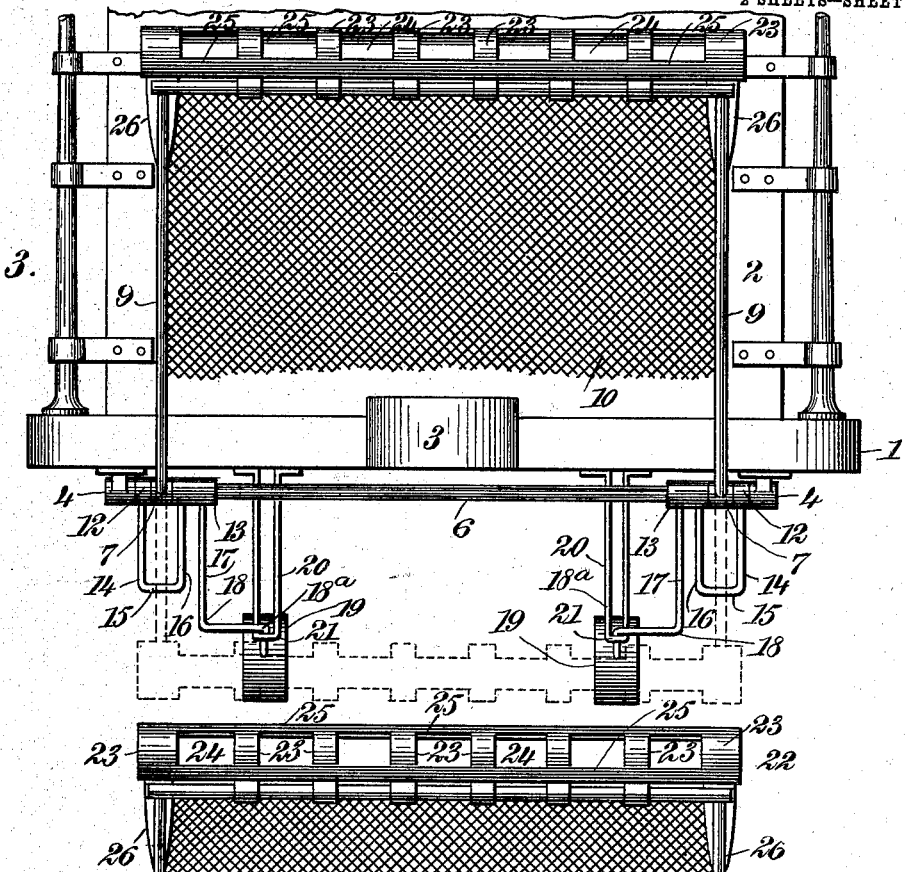
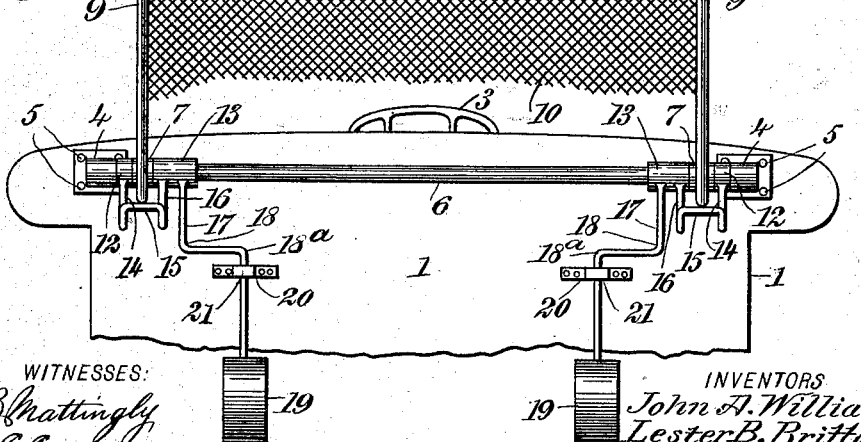

No. 738,647.

Patented September 8, 1903.

UNITED STATES PATENT OFFICE.

JOHN AUDUBON WILLIAMS AND LESTER B. BRITTON, OF SEATTLE, WASHINGTON.

CAR-FENDER.

SPECIFICATION forming part of Letters Patent No. 738,647, dated September 8, 1903.

Application filed April 29, 1903. Serial No. 154,846. (No model.)

*To all whom it may concern:*

Be it known that we, JOHN AUDUBON WILLIAMS and LESTER B. BRITTON, citizens of the United States, and residents of Seattle, in the county of King and State of Washington, have invented a new and Improved Car-Fender, of which the following is a full, clear, and exact description.

This invention relates to safety-fenders for cars and other vehicles; and it consists, substantially, in the construction, organization, and combinations of parts hereinafter particularly described and claimed.

The invention has for its principal object to provide a safety-fender for cars and similar vehicles which is automatic in operation, besides being inexpensive to manufacture, as well as durable, and comprising comparatively few elements or parts which are simple in their embodiment and not liable to get out of order.

A further object of the invention is to provide a device of the character referred to which is thoroughly effective and reliable in use and one also which in operation readily conforms to inequalities of grade traversed by the vehicle without necessitating lifting of the structure or other manipulation thereof on the part of the operator directing the movements of the vehicle.

The above and additional objects are attained by means substantially as are illustrated in the accompanying drawings, in which similar characters of reference indicate corresponding parts in all the views.

Figure 1:
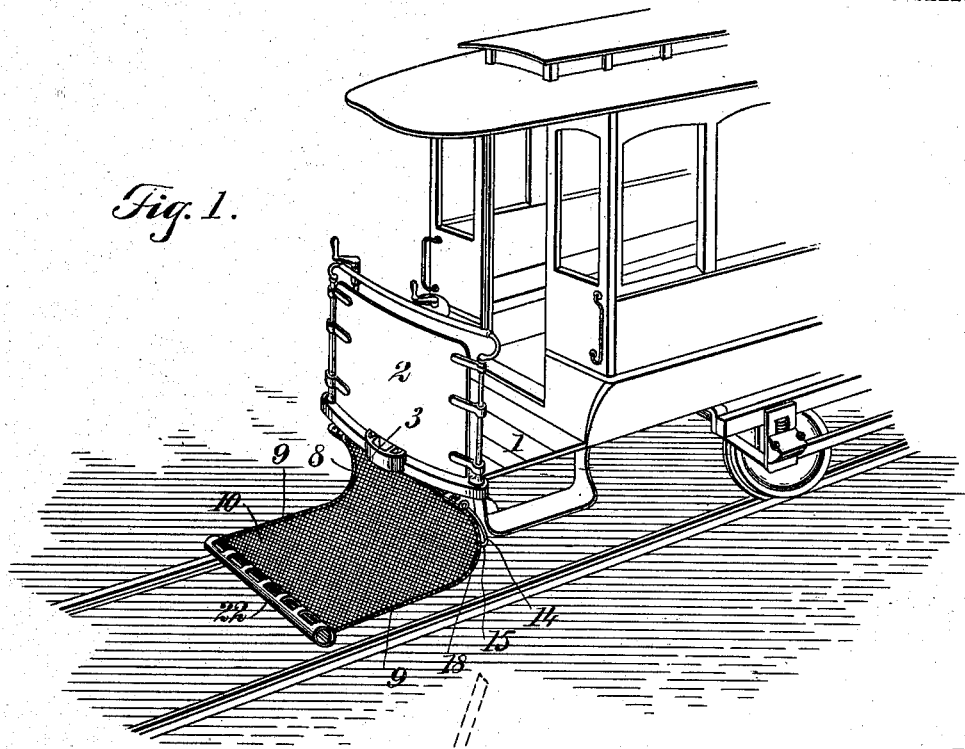
Figure 2:
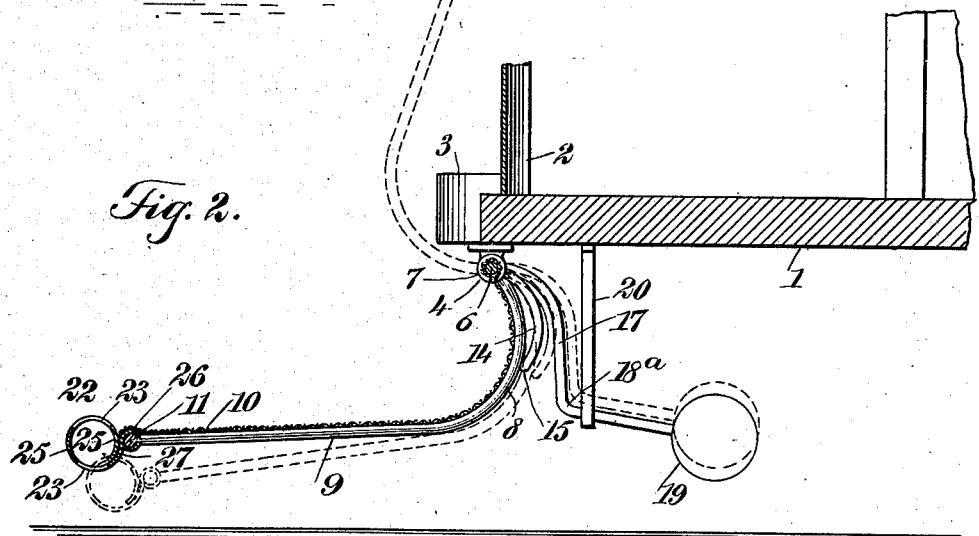

Figure 1 is a view in perspective of a portion of a car or other vehicle having our improved fender embodied in connection therewith. Fig. 2 is an enlarged longitudinal sectional view in detail, showing in dotted lines the manner of operation of our improved car-fender on encountering an object in the path of travel of the car and also showing in further dotted lines the manner in which the basket or scoop may be turned up out of the way for any purpose desired. Fig. 3 is an enlarged front elevation (the basket or scoop being elevated or raised) of our improved car-fender, the same indicating the construction and organization of the several coöperative elements or parts thereof more clearly; and Fig. 4 is a bottom plan view of the fender with the basket or scoop in its lowered or operative position.

Before proceeding with a more detailed description it may be stated that in the embodiment of our invention herein shown we employ a basket or scoop of any desired construction which is movably suspended in position at the end of the car or other vehicle, and we also employ a special embodiment of devices whereby the lower forward end of the basket or scoop is normally maintained a suitable height above the rails or surface over which the car may be propelled, said basket or scoop being capable of independent movement on its supports, by which the same may be turned upwardly and out of the way against the dashboard of the car, as will hereinafter more fully appear. The construction and organization of the operative parts of our device are such that they may be easily and quickly applied in position or removed, and while we have herein represented a certain preferred embodiment of these parts we do not wish to be understood as limiting ourselves to the precise details thereof in practice, since immaterial changes therein may be resorted to coming within the scope of our invention.

Specific reference being had to the drawings by the designating characters marked thereon, 1 represents the platform of an ordinary car or similar vehicle, and 2 the dashboard thereof, an ordinary coupling-head 3 being also shown, by which connection may be made with another car similarly provided. Mounted in suitable bearings or hangers 4 4 therefor, secured at 5 5 on the under side of said platform 1, at the forward edge thereof, is a fixed rod 6, and loosely fitting upon said rod a short distance within each of the said bearings or hangers 4 4 is a collar or ring 7, said collars being rigid with the inwardly and upwardly curved ends 8 of the parallel side bars or members 9 of the basket or scoop 10 of the fender, which basket is preferably made up of wire-cloth, although it is evident that the same may be constituted of canvas or other suitable flexible material. The lower forward ends of the side bars are connected by a rigid bar 11, to which also the lower edge of the basket or scoop is attached in any suitable way, it being understood, of course, that the upper edge of the basket is attached in like manner to the rod 6, while the side edges thereof are attached to the side bars 9 also in any suitable way. Also fitting upon the rod 6, near each end thereof, and on opposite sides of each of the movable collars or rings 7 thereon are a pair of sleeves 12 and 13, each of the latter, 13, being somewhat the longer of the two, and to each of the said sleeves 12 is rigidly connected the end of an arm 14 of a curved abutment 15, the end of the other arm 16 of which is similarly connected to the adjacent sleeve 13. (See Figs. 3 and 4.) To each of said sleeves 13 is also rigidly fastened or connected the upper end of a member 17, which extends somewhat below its corresponding abutment 15 and is bent inwardly and rearwardly at 18 and 18ª, the inner end thereof being provided with a weight 19, as shown. These latterly-described devices operate to counterbalance the weight of the basket or scoop structure in a manner to normally maintain the forward cross-bar 11 thereof a short distance above the ground or track level, (see full lines, Fig. 2,) and the said members 17 of said sets of counterbalance devices each works in a guide 20 therefor, secured to the under side of the platform 1, the lower portion 21 of such guide serving to limit the downward movement of the member and its weight, thus to prevent the forward end of the basket or scoop from being elevated too high and also preventing said member and weight from being carried too close to the ground-surface.

From the foregoing it will be seen that whenever the lower forward edge of the basket or scoop encounters an object in the path of travel of the car the said edge will be depressed or forced downwardly by the resistence offered by the object and the said object will be caused to tilt into the basket and be picked up thereby, due to the movement of the traveling car, on which the entire device is mounted. During such action the operative elements of the device will be carried to the positions indicated in dotted lines in Fig. 2; but as soon as the object may be lifted out or removed from the basket the counterbalancing devices for the latter immediately restore the said elements to normal position automatically, no part of the operation in either instance being required to be performed by the motorman or other operator. It will be seen also that whenever inclines or uneven surfaces are traversed by the car and the fender the said basket or scoop will freely yield upwardly in accordance therewith, and in this way the scoop is not liable to be doubled up or crushed, such as might happen were it not for the independent vertical movement which the basket has relatively to the other parts of the structure. By virtue of such construction also the basket may be raised up out of the way when desired, and we may also in some instances cut out a section of said basket to enable the coupling of two cars through the opening thus formed while the basket is in its upwardly-folded position. (Indicated in dotted lines in Fig. 2.)

In order that a person or animal struck by the fender may not be injured by the force of contact thereof, we preferably provide the lower forward edge of the fender with a yieldable buffer device or cushion all the way across the same, consisting in the present instance of a hollow tubular structure 22, which is practically skeleton-like and comprises ring-sections 23, separated by spaces 24 and connected longitudinally by strips 25, the endmost ones of said ring-sections being attached or secured at 26 to the side bars 9 of the basket. Said sections 23 are separated longitudinally of the bar 11, and one of the curved extremities thereof is turned within the other at 27, so that when the forward surface of the buffer device or cushion encounters an object the tendency of said device will be to coil or roll up lengthwise, thus serving to yield, as is apparent, whereupon the ring-like sections will be again restored to their original positions of their own elasticity or resiliency as soon as pressure thereon is removed, it being mentioned that the said device 22 is preferably formed of spring-steel or other suitable material for the purpose. Instead of the specially-constructed buffer device herein shown and described we may adopt other forms, as is apparent, without departing from the spirit or scope of our invention.

Having thus described our invention, we claim as new and desire to secure by Letters Patent—

1. A car-fender, comprising a suitably-supported depressible scoop, constructed at the forward edge thereof with a tubular buffer device, divided longitudinally, and having one edge turned within the other, and means for normally maintaining said device above the track-level.

2. A car-fender, comprising a suitably-supported depressible scoop, constructed at the forward edge thereof with a tubular buffer device, divided longitudinally, and having one edge turned within the other, and means for normally maintaining said device above the track-level, said means being constituted in part of an abutment for the scoop.

3. A car-fender, provided at the forward edge thereof with a buffer device, comprising a tubular structure divided longitudinally and having one edge turned within the other.

4. A car-fender provided at the forward edge thereof with a buffer device, comprising substantially ring-sections connected by longitudinal strips, and divided on coincident lines parallel with said strips, one of the extremities of such rings being turned within and lapped by the other.

5. A car-fender comprising a fixed rod, a basket with side bars having their inner ends movably mounted on said rod, a pair of sleeves at each end of the rod, one on either side of the corresponding side bar, an abutment connecting the sleeves of each pair, an inwardly and rearwardly extending member from one sleeve of each pair, provided with a weight, and a guide for each of said members, limiting the downward movement thereof.

In testimony whereof we have signed our names to this specification in the presence of two subscribing witnesses.

JOHN AUDUBON WILLIAMS.
LESTER B. BRITTON.

Witnesses:
C. J. RILEY,
CHAS. F. BAILEY.